United States Patent
Ayandeh

Patent Number: 6,069,895
Date of Patent: May 30, 2000

[54] DISTRIBUTED ROUTE SERVER

[75] Inventor: Siamack Ayandeh, Kanata, Canada

[73] Assignee: Nortel Networks Corporation, Montreal, Canada

[21] Appl. No.: 08/921,028

[22] Filed: Aug. 29, 1997

[51] Int. Cl.[7] .................................................. H04L 12/56
[52] U.S. Cl. ........................................... 370/399; 370/389
[58] Field of Search ....................................... 370/389, 392, 370/395, 396, 397, 400, 238, 254, 399

[56] References Cited

U.S. PATENT DOCUMENTS

| | | | |
|---|---|---|---|
| 4,905,233 | 2/1990 | Cain et al. | 370/94 |
| 5,633,866 | 5/1997 | Callon | 370/397 |
| 5,649,108 | 7/1997 | Spiegel et al. | 370/400 |
| 5,987,521 | 11/1999 | Arrowood et al. | 709/239 |

*Primary Examiner*—Douglas W. Olms
*Assistant Examiner*—Ken Vanderpuye
*Attorney, Agent, or Firm*—Max R. Wood

[57] ABSTRACT

A design for a network route server in which network routing functions are distributed throughout the processing elements that constitute a switching node, while maintaining the global identity and routing information exchange functions of a route server element (RSE). Intelligent line-cards are provided having the ability to route independently of the RSE. This removes the RSE as a bottleneck resource and ensures that the capacity of the switching node is limited only by the switching capacity of its switch fabric. The RSE serves the functions of network topology discovery and routing table construction using a network topology database and an optimal routing algorithm. Copies of the dynamically maintained routing tables are distributed to the intelligent line-cards on a periodic basis governed by predetermined criteria. Wider geographical distribution of the RSE is enabled and most efficient utilization of the switch fabric is ensured. Scaling of distributed switching architectures is also enabled. The advantage is a significant increase in switching capacity as well as an increased degree of network connectivity.

19 Claims, 4 Drawing Sheets

DISTRIBUTED ROUTE SERVER

TECHNICAL FIELD

The present invention relates to telecommunications packet or cell switches and, in particular to a scalable architecture for a network route server which is capable of efficiently switching both connectionless and connection-oriented payload traffic.

BACKGROUND OF THE INVENTION

In the currently-evolving network environments, there is an increasing requirement for flexible connectivity between switching nodes for the carriage of payload, control and management traffic. Although switching nodes were once monolithic entities, they are more and more becoming complex distributed architectures which facilitate diversity in services and scalability in capacity. The rapid growth of packetized data traffic in LEC and IEC networks requires that switching nodes perform muli-layer switching functions and handle both connectionless and connection-oriented network traffic. Therefore, there exists a need for scalable routing and forwarding functions in a distributed switching architecture.

Both existing and evolving routing protocols such as Asynchronous Transfer Mode (ATM), Forum Private Network-Network-Interface Specification (PNNI), Internet Open Shortest Path First (OSPF), and International Standards Organization (ISO) Open Systems Interface (OSI) identify a network node by the identify of its Route Server Element (RSE) which is some form of global address. Each RSE generates a routing table based on a preferred performance metric and a most recent topological view of the network. The table thus creates optimal routes for communication throughout the network. The RSE is responsible for administration of the algorithms that enable a node to keep its view of the network topology and performance metric current, referred to as Routing Information Exchange (RIE). This combination of responsibilities often necessitates the need for the RSE to act as a central focus for the routing of traffic through the switching node. The consequence of this is that the RSE becomes a bottleneck resource limiting the capacity and scalability of a distributed switch architecture.

The impact of this bottleneck has been recognized and efforts to minimize its impact have resulted in the invention of intelligent input/output controllers which autonomously handle a portion of the packet routing function. Such controllers are described for example in U.S. Pat. No. 4,494,230 which issued on Jan. 15, 1985 to Turner, and U.S. Pat. No. 5,367,518 which issued on Nov. 22, 1994 to Newman. These patents respectively describe packet switching systems dedicated to connection-oriented traffic in which intelligent controllers request packet routing information from a central control unit only on call connection setups. The routing information supplied by the central controller is stored in a routing look-up table in controller resident memory. Thereafter, the controller uses the same routing information to route all packets associated with the call connection, thus freeing the central controller to attend to other functions. While this switching model improves the switch throughput of connection-oriented packet switching systems, it does not alleviate the central controller bottleneck for connectionless payload traffic. The exponential growth of packetized data traffic is now placing onerous switching burdens on network nodes. There therefore exists a need for a network route server having scalable routing and forwarding functions in a distributed switching architecture in order to supply the packet switching capacity now required.

SUMMARY OF THE INVENTION

It is therefore an object of the invention to provide a scalable switching architecture for a network route server in which the routing functions are not deeply embedded in the switch architecture.

It is a further object of the invention to provide a scalable architecture for a network route server in which routing functions are distributed to intelligent line-cards which autonomously handle the routing of all packet traffic.

It is a further object of the invention to provide a scalable architecture for a network route server in which the central controller is dedicated to network topology discovery and dynamic routing table maintenance based on network payload traffic to ensure improved connectivity and switching efficiency in the network.

The invention therefore provides a network route server with a scalable switching architecture comprising a route server element with which a node identity in the network is associated, the route server element including processor means for executing a topology discovery protocol and maintaining a topology database of the network, and for creating a routing table for the route server using the topology database and a routing algorithm, the route server element periodically copying the routing table to an array of packet processing elements associated with the route server element;

each packet processing element having a link-port interface to the network, memory means for storing the copy of the routing table, and processor means for using the routing table to route packets received by the processing element whereby each packet processing element is enabled to autonomously route any packet received by the packet processing element by reference to the copy of the routing table; and a switch fabric for switching of packets between the packet processing elements in accordance with the routing information provided by the packet processing elements.

The invention therefore provides a scalable switching architecture which removes routing as a functionality that is closely embedded within the switch architecture. It therefore becomes possible to integrate switching and routing across the network over a wider geographical area. The resulting architecture is capable of significantly increasing the switching capacity as well as increasing the degree of network connectivity. The network connectivity is increased because the RSE is dedicated to performing information routing exchange functions and relieved of the load-dependent function of traffic forwarding which is handled by the packet processing elements, hereinafter referred to as "intelligent line-cards". Consequently, the scalable architecture in accordance with the invention permits improved scaling as network size increases.

The performance requirements of the distributed route server architecture are preferably enabled with a two-level priority control mechanism. The control connectivity mechanism should also be over-provisioned with sufficient capacity to permit multi-cast and reliable end-to-end transmission capability. Overall the performance of the distributed architecture provides reduced transit delays and a capacity that scales to the capacity of the switch fabric.

The network route server in accordance with the invention consists of a central control which is responsible for attending to all admission control for connection-oriented services and Virtual Circuit Identifier (VCI) tables for connection-oriented traffic. It is also responsible for network topology discovery and executes a network topology discovery protocol in which network topology packets are exchanged with other network nodes in order to maintain a dynamic link-state topology database that reflects the current network connectivity. Using the topology database and a preferred routing algorithm, the central control builds and rebuilds routing tables used for routing packets to an adjacent node. The VCI tables and the routing tables are downloaded to the intelligent line-cards on a periodic basis dictated principally by the amount of time required by the central control to perform routing table calculations. Thereafter the updated routing tables are distributed to the intelligent line-cards as soon as possible without putting undue stress on nodal resources. Routing table updates may likewise be dictated by a change in network topology or significant traffic fluctuations reported via link-state packets.

VCI tables in the line-cards are updated on the setup of new connections or the tear-down of existing connections.

DETAILED DESCRIPTION OF THE PREFERRED EMBODIMENT

The scalable switching architecture for a network route server in accordance with the invention distributes the network routing function throughout the processing elements that constitute a switching node, while maintaining the global identity and the RIE function at the RSE. The ability of each intelligent line-card to route independently removes the RSE as a bottleneck resource and the capacity of the switching node is then limited only by the switching capacity of the switch fabric. A variety of technologies are now available to make the capacity of the switch fabric engineerable to match the size and roll of the switching node. Routing is thereby converted from a function which is frequently deeply embedded in the switch architecture to a configurable platform independent distributed application. By extracting routing from being embedded within the switch architecture it becomes possible to integrate switching and routing across the network over a wider geographical area. This is an important factor in a drive towards routing technology convergence as the clash of voice and data networks enters a new phase.

In order to explain a generic model of basic routing functions in a network server, three widely used routing and connection management protocols are briefly discussed below. Those routing and connection management protocols include OSI Intermediate Systems to Intermediate Systems (IS-IS), Internet OSPF and ATM forum PNNI. The first two protocols deal with connectionless routing of packet data while the latter includes capabilities for handling of connection-oriented multi-media services. The generic model captures the essence of the routing and forwarding functions and is used to develop the metrics for dimensioning the model to assess the performance of the distributed route server and its forwarding engine in accordance with the invention.

OSI Intra-Domain Routing Information Exchange

In accordance with the ISO/IEC 10589 protocol, routing domains are composed of areas within which detailed routing information is maintained within individual network elements that comprise an area. These network elements are referred to as Intermediate Systems (IS). They are capable of dynamic auto-configuration of the area topology as well as the forwarding of protocol data units (PDU) received from adjacent nodes known as neighbours. Each node develops a routing table which allows PDUs to be forwarded based on some optimal policy such as a Shortest Path First (SPF) algorithm. While neighbours use a Hello-protocol to maintain adjacency, a "flooding" scheme is used to exchange authenticated link states throughout an area. In a flooding scheme, when an IS receives a PDU it automatically copies the PDU to all adjacent nodes with which it has a neighbouring relationship and the PDU thereby propagates throughout the network. Link states carry addressing and quality of service (QOS) information. In accordance with ISO 8473 which relates to a protocol for providing the connectionless mode network service, four metrics are carried: default, delay, expense, and error metrics. Protocol is also flexible enough to permit the creation of sub-nets advertised through designated intermediate systems. The forwarding function provides a connectionless network layer capability where a PDU is carried closer to its destination as it traverses the network domain. Routing between areas is accomplished through a second level of hierarchy where each area is represented by level-2 intermediate system. Level-2 intermediate systems use area addresses to route a packet according to some optimal policy such as SPF to the nearest level-2 IS which in turn forwards the packet within the destination routing area.

Internet Open Shortest Path First (OSPF)

In the Internet Protocol (IP), networks consist of autonomous systems (AS) each consisting of routing areas. Within an area area sub-nets are formed for the purpose of establishing adjacencies and flooding of link state information. The OSPF link state protocol is capable of dynamic auto-configuration of the AS topology as well as forwarding of packets received from adjacent nodes. Link states are propagated depending on the location and designation of the routers which are responsible for routing table maintenance and forwarding of packets. Four types of routers are defined. They include: internal, border, backbone and boundary routers. A single router may have more than one designation. Complete link state information is advertised within an area by internal routers while summary route information is advertised on the backbone and by the border and boundary routers. This permits an optimal routing policy such as SPF to be used for routing within an autonomous system. Each router node therefore maintains a topology database, a routing table and a forwarding capability. A Type of Service (TOS) field in the IP packets may be used to create routes based on QOS requirements such as delay, throughput and reliability. All OSPF protocol exchanges are authenticated.

ATM Forum Private Network-Network Interface Specification (PNNI)

ATM Forum PNNI protocols include both routing and signalling functions in an integral scheme for providing a rich mix of services including the carriage of both connection-oriented and connectionless traffic. In order to accommodate large networks, PNNI creates multiple levels of hierarchy in a given network. The lowest level, referred to as a peer group, is maintained by the use of Hello-protocols and flooding of link states. Logical peer groups are then formed to permit communications between peer groups. This organization is accomplished by selecting peer group and logical peer group leaders which form overlay networks for the distribution of summary routing information at different levels. PNNI uses the services of its signalling part to establish routes between source and destination pairs. Such routes can be selected based on QOS criteria as defined by User Network Interface (UNI) traffic management specifications. These include a comprehensive set of parameters such as available bit rate, maximum supported bit rate, likely variability in end-to-end delay known as "jitter" for cells, and cell loss ratio with cell loss priority. PNNI makes no assumption about an optimal routing algorithm, such as SPF. Optimal routing is left to Implementation. The protocol is capable of responding to changes in traffic patterns in the form of dynamic routing of traffic. This, coupled with reachability information also inherent in the routing database, provides a basis for making efficient routing decisions for the carriage of connection-oriented and connectionless traffic.

Generic Model for the Route Server

Figure 1:
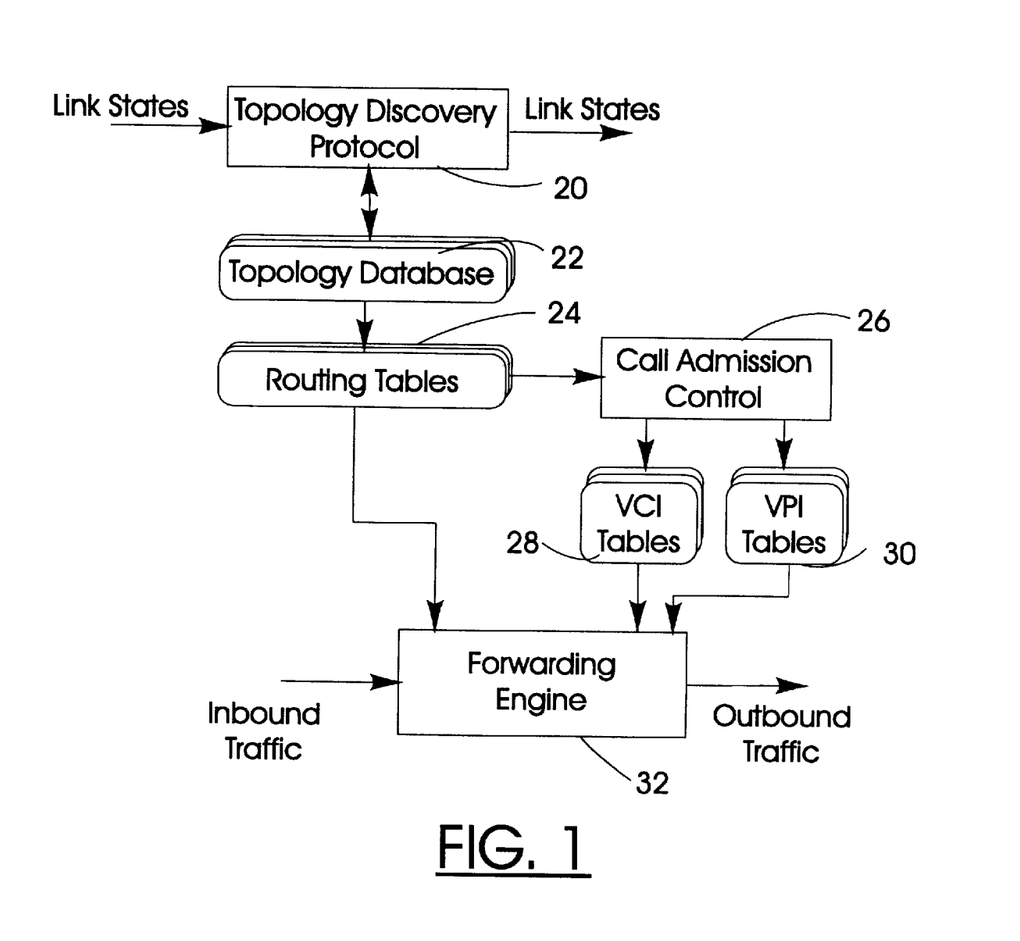
FIG. 1 is a block diagram showing a generic view of routing information exchange in a modern network.

The basic building blocks which provide generic functionality for the three protocols briefly described above are shown in FIG. 1. A topology discovery protocol 20 distributes link state information which is used to build a topology database 22. The topology database 22 includes addressing and reachability information as well as QOS descriptions for various links in the network. The topology database in conjunction with an optimal routing algorithm is used to generate routing tables 24 for directing flows of packet traffic according to given QOS criteria. The routing tables 24 are also used by signalling and call admission controls 26 to set up source-destination routes for connection-oriented traffic. The routing table is also used for routing of connections controlled and tracked by virtual circuit identifiers stored in VCI tables 28 and virtual path identifiers used to identify bundles of virtual connections which are stored in VPI tables 30. VCI and VPI tables are both well known in the art. A forwarding engine 32 uses such routing information to forward inbound connectionless traffic closer to an end destination, or to switch virtual connections.

Performance Dimensions of the Generic Model

The topology database and routing tables are updated to remain synchronized with dynamics of the changing network topology as well as the flow and concentration of traffic throughout the network. The update frequency therefore is of the same order as that of call connection setups, or longer in the case of link reconfigurations. The forwarding engine 32, however, has to be capable of handling packet/cell flows at the line rate. Therefore for connectionless traffic the time required to access the routing tables becomes a critical factor in scaling the capability of the forwarding engine 32. Consequently, distributed implementation of the forwarding function will scale the time required to access the routing tables. Distribution of the routing tables is therefore desirable. Such distribution may be logical, i.e. a shared memory architecture, or physical using a loosely-coupled architecture shown in the preferred embodiment schematically illustrated in FIG. 2, which will be explained in detail below. The performance metrics of such a scalable switching architecture can be described in terms of three parameters:

1. Packet transit delay: defined as the interval between arrival of the last bit of an incoming packet (or its header) on an input port of a route server and that of transmitting the first bit of the same packet on the destination output port of the route server.
2. Packet loss: occurs due to capacity limitations of the forwarding engine 32 or switch fabric. Note that further packet loss may occur at output buffers of the switch, which is independent of the architecture of the route server.
3. Packet throughput: defined as the rate at which packets can be processed reliably. It is desirable that switch capacity be limited by that of the switch fabric rather than that of the routing function or that of the forwarding engine 32.

Scalable Switching Architecture for a Network Route Server

Figure 2:
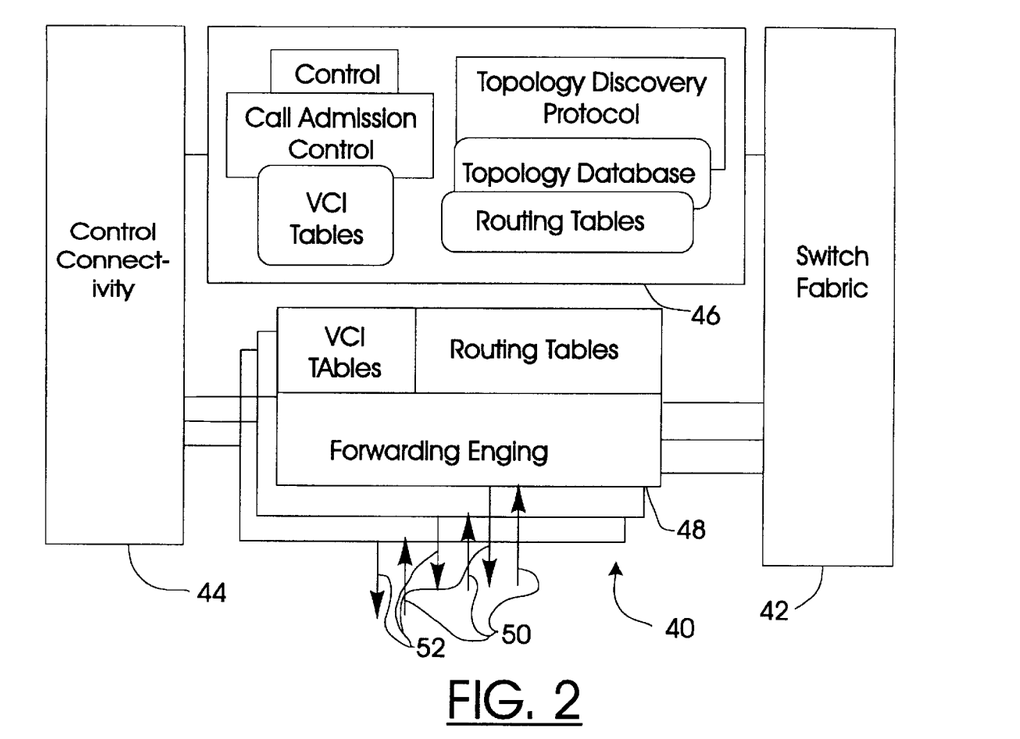
FIG. 2 is a block diagram showing a preferred switching architecture for a net route server in accordance with the invention.

The scalable switching architecture for a network route server in accordance with the invention is schematically illustrated in FIG. 2. The network route server, generally indicated by reference 40, includes a switch fabric 42 and control connectivity 44. The switch fabric 42 and the control connectivity 44 are shown as separate entities in FIG. 2 to differentiate the basic design functions. The control connectivity 44 is preferably a backplane bus, well known in the art. It is possible, nonetheless, to overlap the control connectivity 44 and the switch fabric 42. If this is done, however, the switch fabric then must handle the control traffic which is described below, in addition to payload traffic. Such overlap is therefore only desirable in geographically dispersed switching systems where a multi-layer switching architecture is deployed and the lowest layer is responsible for providing control connectivity 44.

The route server 40 in accordance with the invention further includes a central controller 46 and a plurality of packet processing elements referred to as intelligent line-cards 48. The intelligent line-cards 48 are preferably integrated input/output (I-O) controllers having input ports 50 and output ports 52. The ports terminate network links with specific physical addresses. Link state PDUs identify these links and their associated physical address uniquely. In order to achieve a greater degree of efficiency, it is common practice to multiplex traffic from several ports (external links) at a lower speed to a higher speed internal port (via an internal link as opposed to a network link). This requires encapsulation of the network traffic using a protocol based on well-known address resolution protocols. Alternatively, the multiplexing equipment has to appear as an independent network node with a collection of low-speed port/links and one high-speed port/link to the route server. This requires that the multiplexer node participate in network routing functionality independently of the route server. The intelligent line-cards 48 also are equipped with processors and memory to permit them to execute programs relating to sophisticated routing functions. The routing functions which are performed concurrently on the intelligent line-cards include:

Header analysis and error checking: This includes decomposition of a packet to remove header information, identification of the protocol type in use, and header checksum processing. Header checksum processing includes the discard of erroneous packets and checksum calculation, for example, as the lifetime field is updated.

Routing, route recording and forwarding to subnets: Routing includes the decision as to the type of underlying service which should be used to route the packet and includes checking of the QOS parameters. The forwarding function is then invoked which finds the destination port-id based on the information in the routing table. The route recording function adds the network address of the network route server 40 to the list of nodes on the route to the destination address.

Lifetime control: The routing function checks the packet's lifetime and discards the packet is this value is zero. It also decrements the lifetime field of the packet to prevent packets from looping indefinitely in a network.

Segmentation: Some services require packets of a smaller packet size. Consequently, the routing function must detect when segmentation is required and provide packets of a smaller packet size if necessary.

Priority and QOS handling: Any given packet may request a specific priority and QOS treatment as it traverses the network. This capability is implementation-dependent but the route server 40 should be enabled to provide it if required.

Congestion notification: This function enables intermediate nodes to inform the destination of the onset of congestion within the node. Although this function is also implementation-dependent, the general idea is to prevent the accumulation of packets in output queues and to avoid the packet loss which may ensue.

The intelligent line-cards 48 in accordance with the invention accommodate complete copies of the routing tables computed by the central controller 46. These complete copies of the routing tables are downloaded periodically by the central controller 46 to the intelligent line-cards 48 in accordance with criteria which will be explained below in some detail. Providing complete copies of the routing tables and a comprehensive routing function on each intelligent line-card 48 provides the following advantages:

It removes the central controller 46 as a choke point in the overall switch architecture, Consequently, the switch capacity is limited only by the throughput of the switch fabric, which is the desired condition.

It removes the latency in accessing routing information from a central location. In some switching implementations, a centralized approach involves store and forward of the packets through the central control which limits the capacity to half of the throughput of the switch fabric.

Because the packets transit the switch fabric only once in the route server 40 and are subsequently routed by a forwarding engine at the line-cards, transit delays are likewise reduced.

It provides a mechanism for refreshing the routing tables at regular intervals, hence protecting against any unpredictable corruptions.

The only disadvantage of the scalable switching architecture for a route server 40 in accordance with the invention is the cost of hardware required to implement this distributed functionality. In view of the fact that hardware cost is steadily decreasing, the advantages far outweigh this disadvantage.

Performance Requirements of the Route Server

The scalable switching architecture for a route server 40 in accordance with the invention must be enabled to efficiently perform a number of key functions which include call setup, packet/cell forwarding, route discovery interval and routing stability. Distribution of the forwarding function also raises the question of routing and virtual circuit table update frequency and its reliable communication to the intelligent line-cards 48.

Resource requirements of routing protocols are often described in terms of three categories of parameters:

1) For an area of a given size, say "N", ability to update at least N link state packets within an interval of time of "$T_u$" seconds. The interval $T_u$ is selected to permit rapid conversions of area topology without putting undue stress on nodal resources. For dynamic traffic management, this interval also reflects a time constant of the traffic mix in the network.

2) At maximum forward capacity of the node, the route server 40 must have the ability to:
   (a) forward incoming link state packets within a short interval of time, which is designated as "$T_f$" seconds, and
   (b) route table calculations should be completed within a minimal accepted time period which is designated as "$T_r$" seconds.

3) In overload the routing control packets should have priority over payload data packets.

In a distributed architecture these requirements translate to providing adequate CPU capacity at the RSE (central controller 46) to perform functions 1 and 2(b) described above. Items 2(a) and 3 require priority treatment of the routing protocol control packets over any other traffic including payload data. The question of routing table/VCI table update frequency and resource requirement also needs to be considered. Routing table update frequency from the central controller 46 to the intelligent line-cards 48 is preferably determined as follows:

The minimum interval for updates should be equal to or greater than $T_r$ seconds required for route table calculations by the central controller 46. The maximum interval should preferably be set to less than or equal to $T_u$ seconds, which is the time required to update at least one link state packet for each link in the network area of the server 40. Those skilled in the art will appreciate that routes are also calculated as a consequence of any change in the network topology and when significant traffic fluctuations are reported via link state packets.

VC tables in the intelligent line-cards 48 are updated with setup of new connections or take-down of existing connections as they occur.

The size of the routing tables created by the central controller 46 and downloaded to the intelligent line-cards 48 can be on the order of 100 kbytes, or more. Updates to the routing table therefore requires reliable acknowledged end-to-end transmission of several large packets. These packets may be multi-cast to all the intelligent line-cards 48. On the other hand, VCI table updates are relatively small and have individual destinations since each virtual circuit (VC) is handled by individual intelligent line-cards 48. At call setup, as a VC connection threads through the network, it is important to setup the VCI tables rapidly in order to minimize connection setup latency. VCI table updates should therefore have priority over the routing table updates on an end-to-end basis. Control connectivity requirements may therefore be summarized as sufficient bandwidth over-provisioning, multi-cast capability between the central controller 46 and the intelligent line-cards 48, and reliable end-to-end transmission and priority control for low latency transmission of connection setup and tear-down parameters. Integration of control connectivity with the switch fabric places similar performance requirements on the switch fabric.

Performance Impact of Route Server on Scalable Switch Architecture

The network route server 40 is preferably configured to meet the above-identified performance requirements using a dual-level priority scheme throughout the system. This includes the processing of routing control packets or control cells at a higher priority than payload data packets, as well as communicating VCI table updates at a higher priority than routing table copies. In order to assess the capacity requirements of routing table updates and connection management traffic, a dual-level head-of-line priority model is employed as taught by Klienrock in "Queuing Systems Vol. 2", Wiley 1975. The following parameters are used in the calculations:

RC: Connection setup rate.
Xc: Service time of a connection.
Rt: Table update frequency.
Xt: Service time requirement of a table update transaction.
C: Capacity of the server expressed as a unit of service time.

Figure 3:
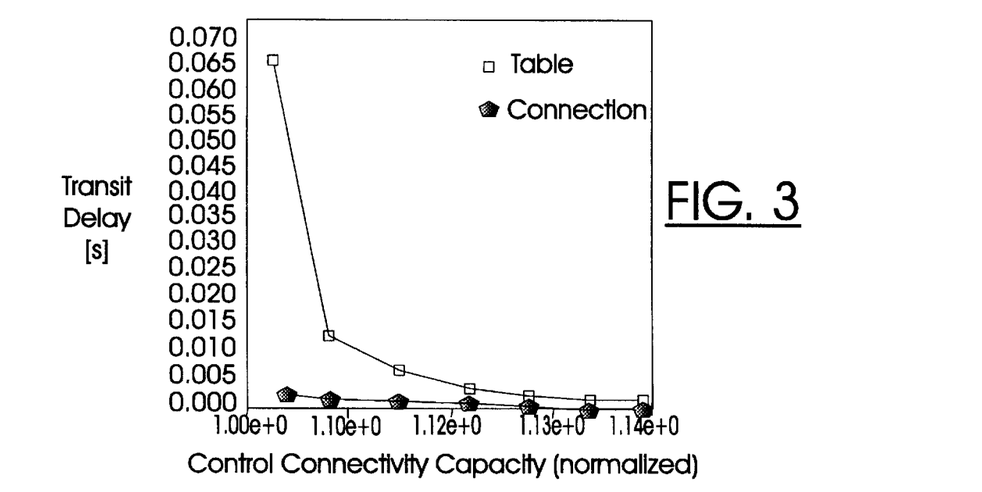
FIG. 3 is a graph showing transaction delay as a function of capacity in the updating of routing tables and virtual circuit connections.

FIG. 3 shows the average delays in servicing of a table update transaction, as well as the average delays of servicing a VCI table update as a function of available server capacity. Those skilled in the art will appreciate that a complete routing table copy will require hundreds of such transactions. Therefore, in order to keep the routing table update interval in the order of 100 ms., 30% over-provisioning of the server control connectivity 44 is preferred.

Transit Delay

In order to assess the transit delay of packets in a central versus a distributed architecture in accordance with the invention, the following parameters are defined:

$T_{rcv}$: Service time to receive a packet.
$T_r$: Service time to route the packet.
$T_{acr}$: Service time to access a central routing table.
$T_f$: Service time to transit the switch fabric.
$T_x$: The sum of $T_{rcv}+T_r+T_f$ used as a unit in the plots shown in FIGS. 4a and 4b.

Figure 4A:
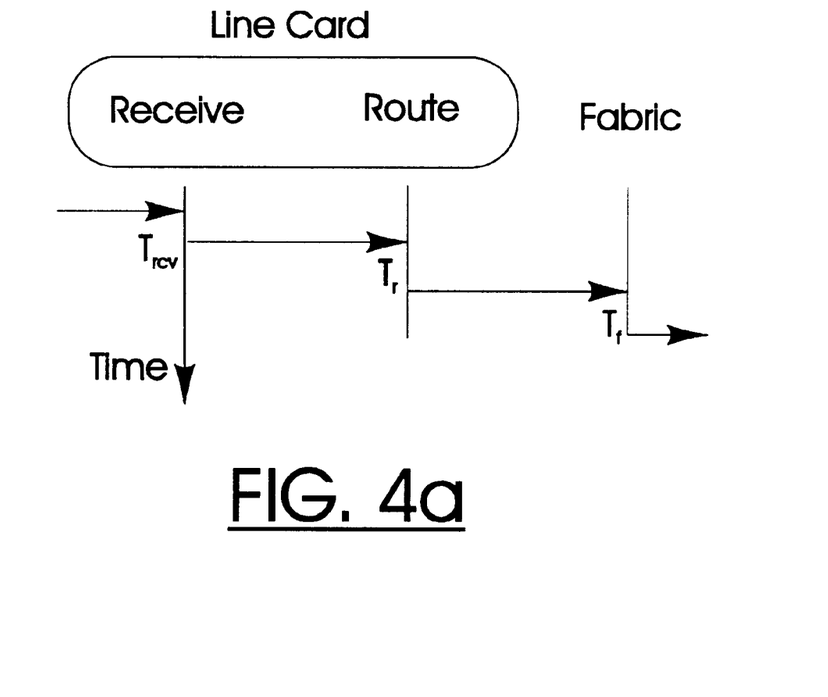
FIGS. 4a and 4b respectively schematically illustrate the transit delay encountered by a packet traversing an uncongested route server having a distributed routing architecture in accordance with the invention and a prior art route server having a centrally-controlled routing architecture.
Figure 4B:
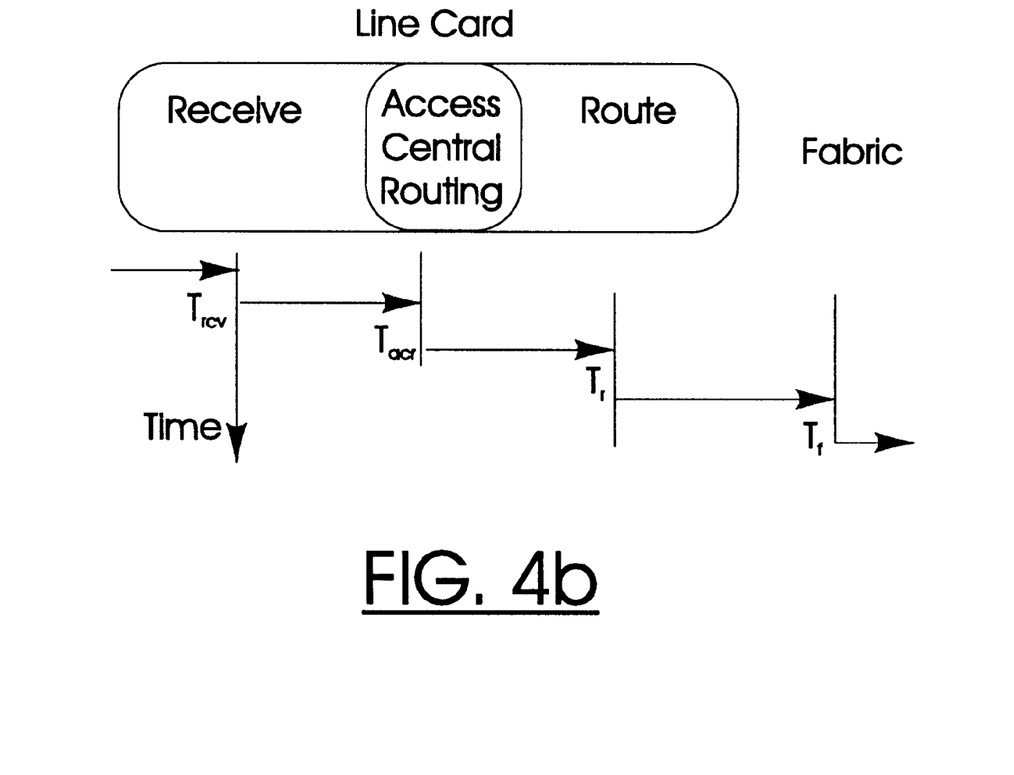

Message flow charts illustrating the distribution of processing in a prior art central control packet switch and a scalable switching architecture for a network route server 40 in accordance with the invention are shown in FIG. 4. Using a multi-stage open-queuing network model as taught by Schwartz in "Telecommunication Networks", Addison Wesley 1987, the load-delay performance of these two configurations are compared in FIG. 5.

In a prior art central routing control packet switch, the throughput is limited by the transaction capacity of the central routing control. The no load transit delays are also greater due to the requirement for an additional function for accessing the central routing tables. As shown in FIG. 4a, the transit delay for a packet switched by a route server 40 consists of:

$$T_{rcv}+T_r+T_f$$

As shown in FIG. 4b, the transit delay in a prior art packet switch using central routing control consists of:

$$T_{rcv}+T_{acr}+T_r+T_f$$

Figure 5:
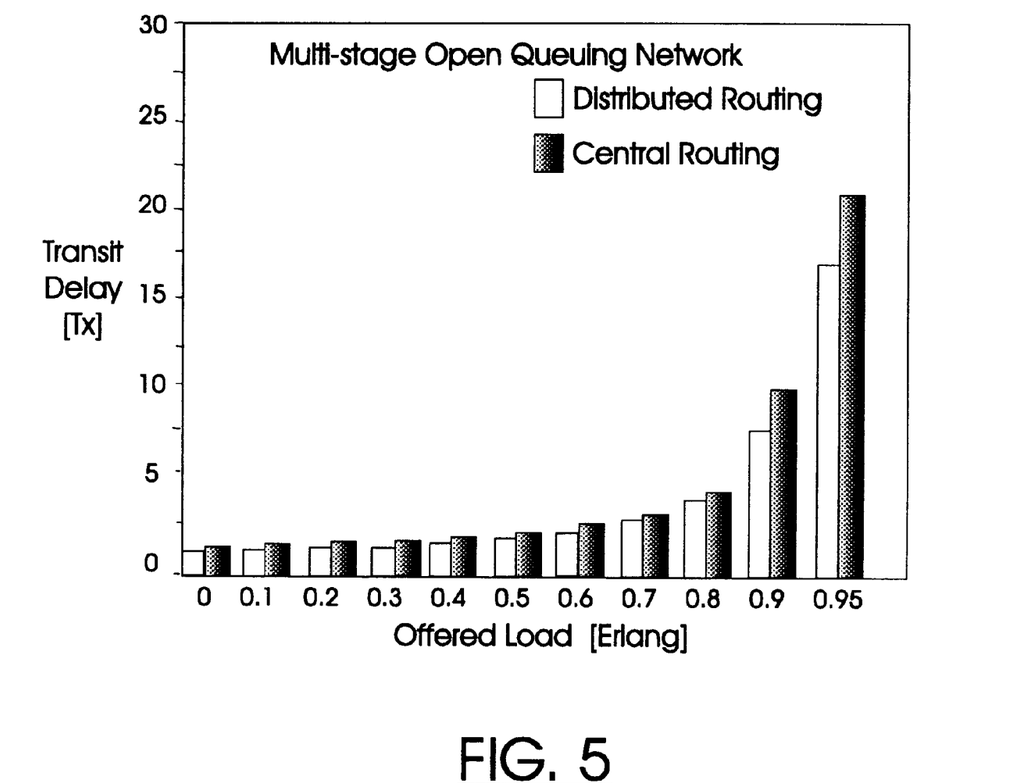
FIG. 5 is a graph showing the transit delays as a function of offered traffic in a route server having a distributed routing architecture in accordance with the invention and a route server having a centrally controlled routing architecture in accordance with the prior art.

It is assumed that the connectivity control is engineered to have sufficient capacity for handling the traffic which results from this access. The route server 40 in accordance with the invention is, however, limited only by the capacity of the switch fabric and the aggregate forwarding capacity of the intelligent line-cards 48. The delay/load performance of a single intelligent line-card 48 as compared to the central control switch in accordance with the prior art as shown in FIG. 5. As is apparent, very substantial improvements in transit delay are realized in the route server 40 and the gains in transit delay increase dramatically as the load offered to the switch increases. It should also be appreciated by those skilled in the art that the aggregate performance of a server constructed with the intelligent line-cards 48 in accordance with the invention scales by increasing the number of intelligent line-cards 48 up to a point where the switch fabric capacity is realized.

The design and performance of a route server 40 which enables the scaling of distributed switching architecture has been described. The route server 40 in accordance with the invention permits the integration of switching and routing across a network and over a wider geographical area. The resulting architecture is capable of significantly increasing switching capacity as well as an increased degree of network connectivity. The increase in network connectivity is due to the dedication of the central controller 46 to the performance of information routing exchange functions while removing the load-dependent function of traffic forwarding to the intelligent line-cards 48. As a consequence, the scalable switching architecture in accordance with the invention better scales with increasing network size.

The preferred embodiment of the invention described above is intended to be exemplary only. Changes and modifications to the preferred embodiment may become apparent to those skilled in the art. The scope of the invention is therefore intended to be limited solely by the scope of the appended claims.

I claim:

1. A network route server with a scalable switching architecture, comprising:

a route server element with which a node identity in the network is associated, the route server element including processor means for creating a routing table for the route server using a topology database and a routing algorithm, the route server element periodically copying the routing table to each of a scalable array of packet processing elements associated with the route server element;

each packet processing element having a link-port interface to the network, memory means for storing a copy of the routing table, and processor means for using the copy of the routing table to route packets received by the packet processing element, each packet processing element being enabled to autonomously route packets received by the packet processing element by referencing the copy of the routing table; and a switch fabric for the switching of packets between the packet processing elements in accordance with routing information provided by the packet processing elements, the scalable array of packet processing elements having an aggregate capacity that is scalable to a capacity of the switch fabric.

2. A network route server with a scalable switching architecture as claimed in claim 1 wherein the route server further includes a backplane bus or similar means of distribution over a wide area for providing control connectivity between the route server element and the packet processing elements.

3. A network route server with a scalable switching architecture as claimed in claim 1 wherein switching connectivity is provided for data packets through a cell or packet switch fabric.

4. A network route server with a scalable switching architecture as claimed in claim 1 wherein the route server element further controls connection oriented services and provides connection oriented call admission, and data related to virtual circuits associated with connection oriented services are downloaded to the packet processing elements from the route server element each time a connection oriented service request is set up or torn down.

5. A network route server with a scalable switching architecture as claimed in claim 4 wherein data updates to the packet processing elements for data related to virtual circuits associated with connection oriented services are downloaded with priority over all other server traffic.

6. A network route server with a scalable switching architecture as claimed in claim 5 wherein the copying of the routing table is accomplished with a lesser priority than the data updates to the packet processing elements for data related to virtual circuits.

7. A network route server as claimed in claim 1 wherein the route server element periodically copies the routing table to each of the packet processing elements in a multi-cast mode.

8. A network route server with a scalable switching architecture as claimed in claim 1 wherein each packet processing element performs functions which include: header translation and checksum processing; packet lifetime processing; packet routing; and, advising adjacent nodes of a congested condition if packets have accumulated in the input or output buffers of the packet processing element.

9. A network route server with a scalable switching architecture, comprising:

a route server element with which a node identity in the network is associated, the route server element including processor means for executing a topology discovery protocol and maintaining a topology database of the network, and for creating a routing table for the route server using the topology database and a routing algorithm, the route server element periodically copying the routing table to each of a scalable array of packet processing elements associated with the route server element;

each packet processing element having a link-port interface to the network, memory means for storing a copy of the routing table, and processor means for using the copy of the routing table to route packets received by the packet processing element, each packet processing element being enabled to autonomously route packets received by the packet processing element by referencing the copy of the routing table; and a switch fabric for the switching of packets between the packet processing elements in accordance with routing information provided by the packet processing elements, the scalable array of packet processing elements having an aggregate capacity that is scalable to a capacity of the switch fabric.

10. A network route server with a scalable switching architecture as claimed in claim 9 wherein the control connectivity comprises a backplane bus, or is overlaid on the switch fabric for distributed implementations.

11. A network route server with a scalable switching architecture as claimed in claim 10 wherein the route server is geographically distributed and the control connectivity is provided by data packets communicated through the switch fabric.

12. A network route server with a scalable switching architecture as claimed in claim 10 wherein the control connectivity is provisioned 30% over anticipated peak load traffic to keep the routing table update interval low.

13. A route server with scalable switching architecture as claimed in claim 10 wherein a frequency at which the route server element periodically copies the routing table to each of the packet processing elements is greater than the time required by the route server element to calculate a new routing table and less than or equal to a maximum interval represented by the average time required to process N link state packets where N represents the number of links in a network area occupied by the route server.

14. A route server with scalable switching architecture as claimed in claim 13 wherein the routing table is copied to each of the packet processing elements whenever network topology changes or significant fluctuations in traffic that affect routing occur, regardless of whether the maximum interval has expired since a last copy process.

15. A route server with a scalable switching architecture as claimed in claim 10 wherein packets are switched in a dual level priority scheme wherein routing control packets or control cells are switched with a higher priority than payload traffic, and VCI table updates are communicated at a higher priority than routing table updates.

16. A network route server with a scalable switching architecture, comprising:

a route server element with which a node identity in the network is associated, the route server element including processor means for executing a topology discovery protocol and maintaining a topology database of the network, and for creating a routing table for the route server using the topology database and a routing algorithm, the route server element periodically copying the routing table to each of an array of packet processing elements associated with the route server element, and a call admission control module which is responsible for the admission of connection oriented services through the server, the call admission control module receiving virtual circuit connection requests and downloading to a packet processing element, which is to establish the virtual circuit, data related to the virtual circuit;

each packet processing element having a link-port interface to the network, memory means for storing a copy of the routing table, and processor means for using the copy of the routing table to route packets received by the processing element, each packet processing element is enabled to autonomously route packets received by the packet processing element by referencing the copy of the routing table, and to route connection oriented packets in accordance with the data downloaded from the route server element when a virtual circuit is set up;

control connectivity for exchanging control data between the route server element and the packet processing element; and a switch fabric for the switching of packets between the packet processing elements in accordance with routing information provided by the packet processing elements, the packet processing elements having an aggregate capacity that is scalable to a capacity of the switch fabric.

17. A method of routing packets or cells in a network using a route server having a route server element, a plurality of packet processing elements with link-port interfaces, a processor and a memory to permit the packet processing elements to perform routing functions to the network and a switch fabric, comprising:

a) periodically creating at the route server element a routing table using a topology database and a routing algorithm;

b) periodically copying the routing table to a memory in each of the packet processing elements;

c) using the copy of the routing table at each packet processing element to route packets received at the link-port interface of the packet processing element; and d) switching packets between the packet processing elements in accordance with routing information provided by the packet processing elements using the copy of the routing table and the routing functions.

18. The method of routing packets or cells in a network as claimed in claim 17 further including the steps of:

a) controlling at the route server element connection-oriented services and connection-oriented call admission and downloading to the route server elements data related to virtual circuits associated with connection-oriented services each time a connection-oriented service request is set up or torn down.

19. The method of routing packets or cells in a network as claimed in claim 17, further including the steps of:

a) executing at the route server element a topology discovery protocol and maintaining the topology database in response to outputs from the topology discovery protocol.

* * * * *